June 13, 1961 T. E. NEIR 2,988,071
CONCENTRIC VALVE INTERNAL COMBUSTION ENGINE
Original Filed Sept. 26, 1955 7 Sheets-Sheet 1

INVENTOR
THERON E. NEIR

BY *R. F. Barnard*
ATTORNEY

June 13, 1961

T. E. NEIR 2,988,071

CONCENTRIC VALVE INTERNAL COMBUSTION ENGINE

Original Filed Sept. 26, 1955

INVENTOR
THERON E. NEIR
BY R. P. Barnard
ATTORNEY

June 13, 1961 T. E. NEIR 2,988,071
CONCENTRIC VALVE INTERNAL COMBUSTION ENGINE
Original Filed Sept. 26, 1955 7 Sheets-Sheet 7

INVENTOR
THERON E. NEIR
BY
ATTORNEY

United States Patent Office 2,988,071
Patented June 13, 1961

2,988,071
CONCENTRIC VALVE INTERNAL COMBUSTION ENGINE
Theron E. Neir, Dearborn, Mich., assignor to General Motors Corporation, Detroit, Mich., a corporation of Delaware
Original application Sept. 26, 1955, Ser. No. 536,614. Divided and this application Feb. 10, 1958, Ser. No. 714,165
7 Claims. (Cl. 123—79)

The present invention relates to a new and improved internal combustion engine of the concentric valve type. The present engine is conventional to the extent that it utilizes such components as pistons, poppet valves, spark plugs and their normal accoutrements, however, the components have been improved and combined in such a way as to result in a novel and highly improved engine. This is a division of Serial No. 536,614, filed September 26, 1955.

The ultimate aim in the design of any internal combustion engine is the attainment of maximum power output per pound of engine weight. In the case of conventional piston type engines, the point has practically been reached where it is unlikely that any appreciable increase in the power to weight ratio will be made with available materials. It is for the purpose of increasing this ratio, as well as reducing engine size, complication and expense, that the present invention has been developed.

Essentially, the present engine includes a pair of concentrically related inlet and exhaust valves mounted in the cylinder head above each cylinder. From this point forward, however, the present engine represents a series of improvements designed to achieve the general objects hereafter set forth.

Since the power an engine can produce is proportional to the amount of air that can be packed into the combustion chamber, it is a primary object of this invention to provide a valve and air manifold arrangement through which exceptionally large quantities of combustible charge can be delivered per cycle to the combustion chamber.

In the present concentric valve engine it is only necessary to provide a single valve opening or seat in the cylinder head to accommodate the valves, therefore, the valve seat or opening may be of at least twice as large a diameter as is the case with an engine using side by side valves. Thus, the first advantage inherent in the present engine is that an air inlet opening may be provided which, due to its increased area, will admit a considerably larger quantity of air than is possible with a conventional type engine.

Further, it is proposed to provide an air inlet passage which circumferentially communicates with the inlet valve in such a manner as to impart a tornado or tangential swirl to the combustion charge before it enters the combustion chamber. Additionally, a venturi means is provided in the inlet passage to increase the velocity of the charge, the velocity-ram effect of which, in combination with the tangential swirl, provides appreciable self-supercharging.

As a further means of increasing the quantity of combustible charge which may be delivered to the combustion chamber, a unique cam shaft and rocker arm mechanism is provided which positively opens and closes the valves. By this device it is possible to realize a greater valve open area per cycle, resulting in an increased volumetric efficiency.

Another basic object of the present invention is the provision of an air cooling system which uniquely cools the valves and exhaust manifolding in a way to enable the use of less heat resistant, and consequently lighter and cheaper materials. The cooling system derives its circulatory momentum by communicating with the exhaust passage which educts the cooling air through and across the engine components to be cooled. In order to multiply the eductive effect on the cooling system, as well as to provide better scavenging of the combustion chamber, venturi means is provided in the exhaust passage to increase the exhaust gas velocity. In addition to more effective valve cooling, an advantage realized in utilizing the instant air cooling system is a considerable reduction in the size and weight of the cylinder head. This reduction is possible mainly because fewer cored water passages are necessary.

Additional objects will be apparent from a perusal of the structural and functional details set forth in the specification appended hereto.

In the drawings:
FIG. 5 is an elevational cross-section showing the spark plug orientation with respect to the inlet valve and piston.
FIG. 6 is a plan view indicating the spatial relationship between an exhaust pipe and a spark plug recess.
FIG. 7 is an enlarged view of the air valves particularly indicating the air cooling passages as well as the valve actuating collars.

General arrangement

Figure 3:
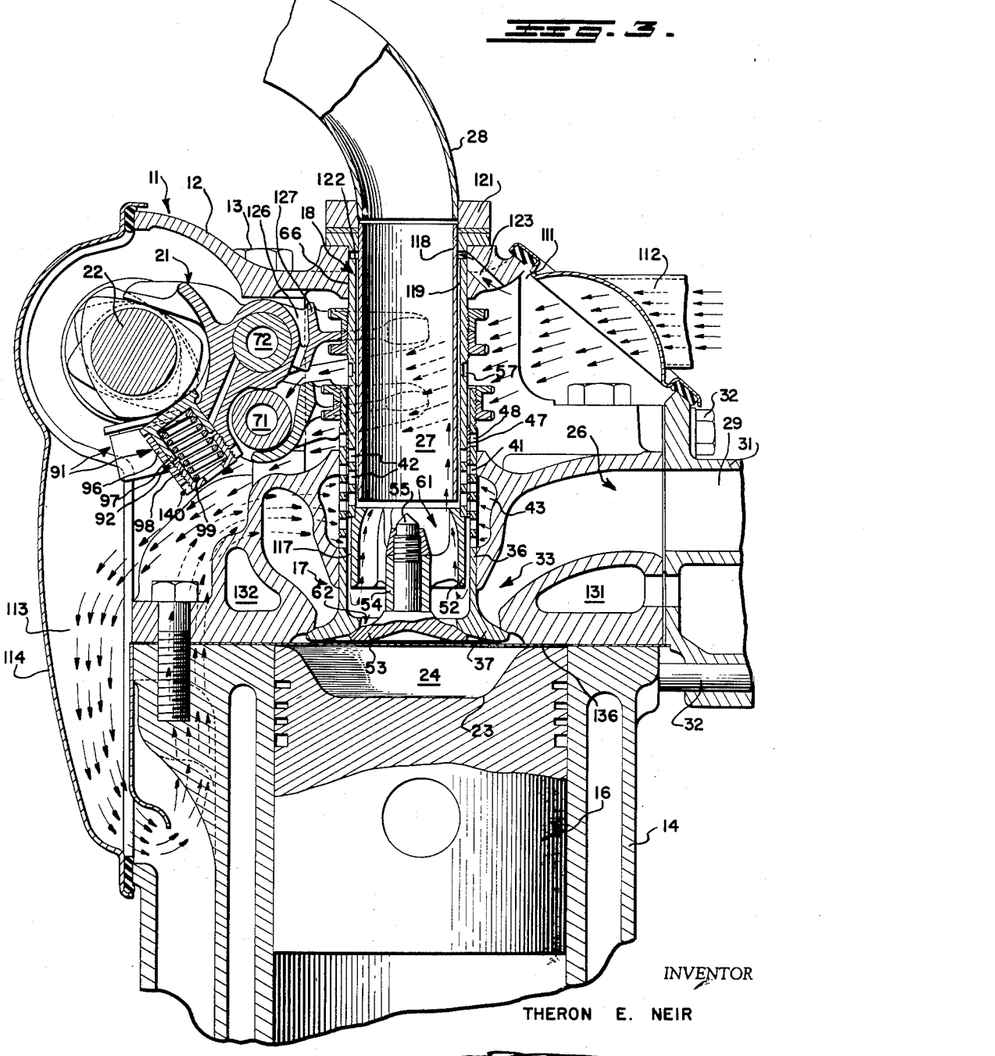
FIG. 3 is a cross-sectional view showing in elevation the overall arrangement of the engine components.

Referring to FIG. 3 of the drawings the upper portion of an engine is shown generally at 11 and includes a cylinder head 12 suitably connected through studs 13 to a cylinder block 14. Reciprocally disposed within the block 14 are pistons 16. The engine is of the overhead valve type and includes concentrically related intake and exhaust valves 17 and 18 disposed directly over piston 16.

Rockably mounted in head 12 are rocker arms 19 and 21 adapted respectively to actuate the intake and exhaust valves 17 and 18. A cam shaft 22 is operatively driven, in any convenient manner, by a crank shaft and in turn actuates the rocker arms 19 and 21 through suitably provided cams.

The head of piston 16 is centrally depressed at 23 and cooperates with the superadjacent portion of the cylinder head 12 to provide a combustion chamber 24. The combustible charge for the engine is supplied through an intake passage 26 while the exhaust gases are evacuated from the engine through an exhaust passage and manifold 27 and 28.

Intake manifold

Figure 1:
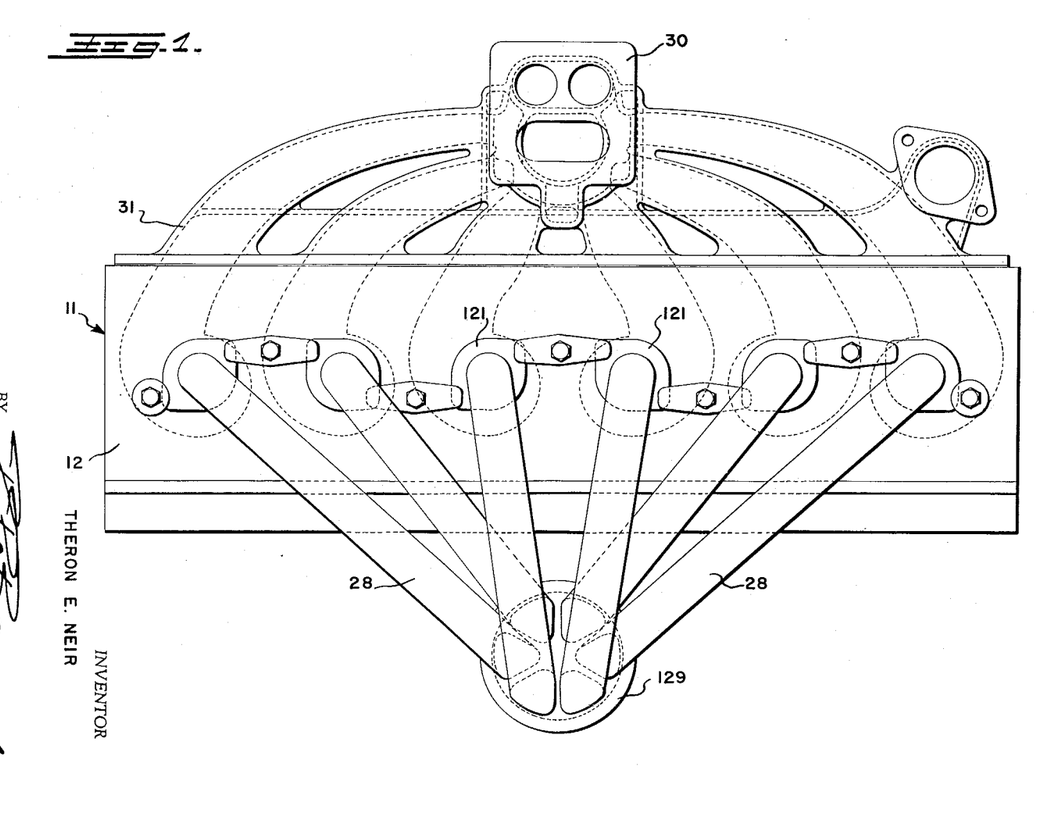
FIG. 1 is a plan view of the engine particularly showing the intake and exhaust manifolds.
Figure 2:
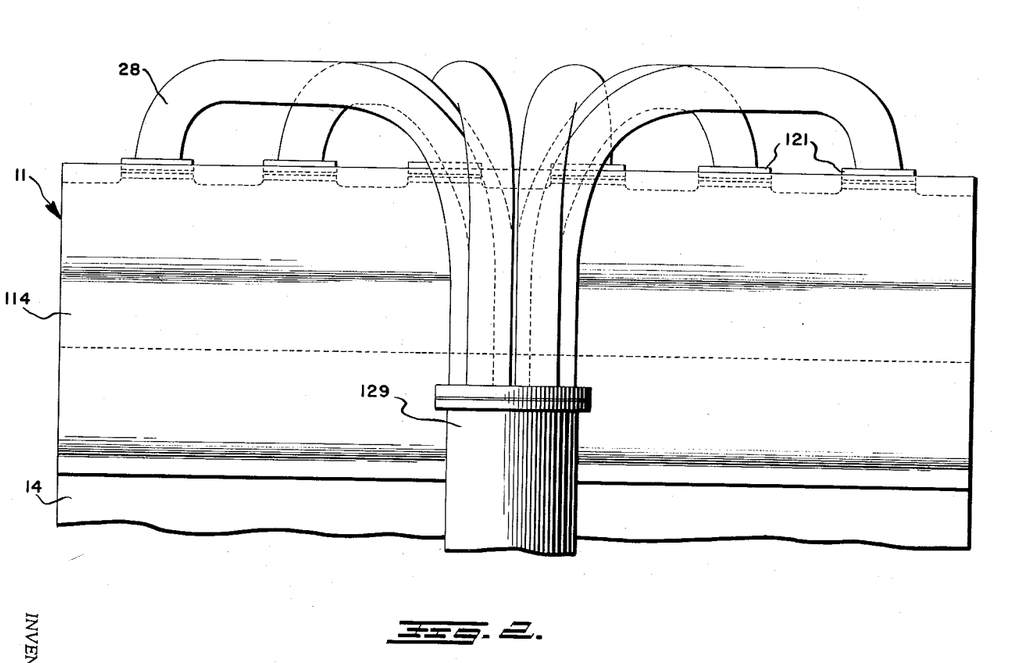
FIG. 2 is an elevational view of the exhaust manifold side of the engine.

One of the purposes and advantages of the instant type engine is the use of smoothly curved intake manifolds 29 as seen in FIGS. 1 and 3. The individual intake manifolds 29 are generally equally and symmetrically distributed about the downstream side of a carburetor casing 30. So arranged, the intake manifold provides a maximum flow of combustible charge to each cylinder as well as a more equal distribution of the charge between the cylinders.

In a conventional internal combustion engine the cylinder head is internally cored to provide intake manifolding constituted of tortuous passageways inevitably having a low flow efficieny due to the frequency and severity of the curves. It is apparent from FIG. 1 that the individual intake manifolds 29 provide gently curving air passageways between the carburetor and each of the cylinders. Since the power an engine can produce is proportional to the quantity of combustible charge delivered to the cylinders, the efficiency with which the charge is delivered directly affects power output. Thus the present intake manifold construction results in an increased power output per cycle of the engine.

When the individual intake manifolds are combined in a single casting 31, the casting may be secured to the side of the head by studs 32 as shown in FIG. 3.

The cored intake passages 29 formed in the manifold register with the corresponding air intake passages 26 particularly as shown in FIG. 3.

Figure 4:
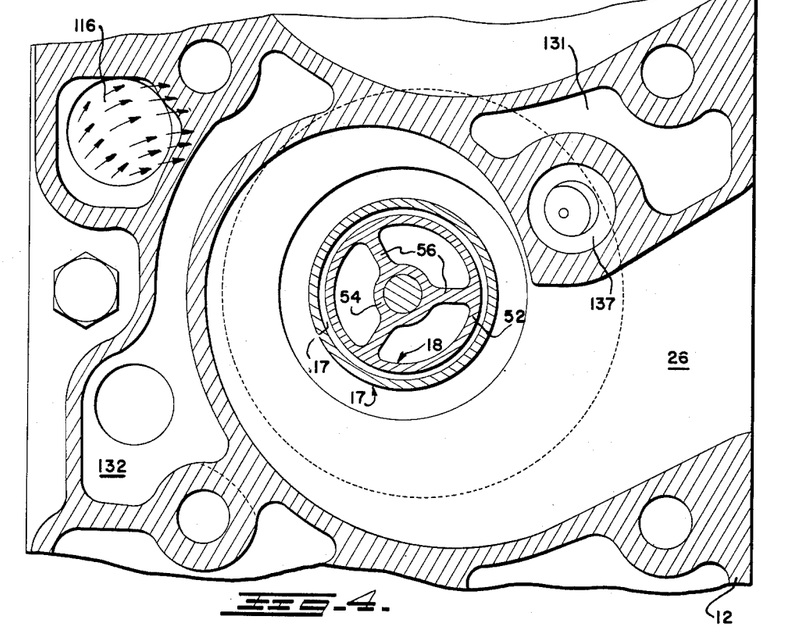
FIG. 4 is a plan cross-section through the cylinder head particularly showing the relationship between the air valves and inlet air passage.

Referring to the sectional view of FIG. 4, it will be observed that the intake passage 26 is in the general form of an involute. Accordingly, the charge is directed into the combustion chamber 24 with a tangential swirl. Such flow is obviously highly turbulent and results in a good mixture of fuel and air.

The tangential or tornado swirl imparted to the charge has the added salutary effect of throwing the heavier, more difficult to vaporize particles against the outer wall of the intake passage where they better mix with the air thus making a more homogeneous charge. The exposure of the charge to the warm passage wall eliminates the necessity of providing exhaust gas or other heat at the carburetor mounting portion of the intake manifold for fuel vaporization. Thus a considerable saving in cost in manifold manufacture is realized and the nuisance of vapor lock due to poor heat control in hot weather is largely eliminated.

In order to further increase the velocity of the entering charge the cross section of the inner end of the intake passage 26 is reduced or constricted to provide an annular venturi 33. The venturi in addition to increasing turbulence by increasing charge velocity has a supercharging effect through packing or ramming more air into the combustion chamber per cycle of the piston.

This self-supercharging aspect of the instant manifold and intake passages stands in rather stark contrast to the frequently, pockety, erratic and inefficient charge flow through a straight or radial flow port and small valve port area, infra, of a conventional engine.

Valves

Essentially, the improvements in performance of the present engine over more conventional piston type engines resides in the use of the nested or concentric type inlet and exhaust valves 17 and 18. The inlet valve 17 includes a cylindrical or tubular stem or trunk portion 36 having an annular valve head 37 formed at one end thereof. Valve 17 is reciprocally supported within a valve supporting passageway formed in the cylinder head 12. The valve supporting passageway extends completely through the cylinder head and terminates at the upper and lower faces thereof. The outer peripheral portion 35 of the upper face of the valve seat, FIG. 7, is adapted to coact with and seat upon a superadjacent annular edge 38 formed in the cylinder head and to therewith define an annular inlet port 39 for the combustion chamber 24.

A plurality of air holes 41 are provided in the inlet valve trunk 17 intermediate the ends thereof. The air holes are in constant registry with corresponding holes 42 formed in the exhaust valve as well as with an air chamber 43 formed in the cylinder head. The purpose of the air holes and further details thereof will be discussed, infra, in relation to valve cooling.

The upper end of the inlet valve trunk 36 is externally threaded to receive a collar 46.

A thin sleeve 47 is press-fitted within the intake valve trunk to provide a low friction bearing material within which the exhaust valve may reciprocate. The sleeve 47 is also provided with air holes in registry with the holes 41 in the intake valve. A plurality of holes 48 provided near the upper end of the valve trunk 36 are internally blocked off by sleeve 47. The holes 48 are intended merely as recesses adapted to receive a spanner wrench, not shown, which is used to grip the valve for the adjustment thereof, infra.

Exhaust valve 18 includes a cylindrical or tubular trunk 51, a webbed valve supporting portion 52 and a valve head 53. The webbed portion 52 may be integral, welded or otherwise affixed to the trunk 51 and includes an internally threaded support sleeve 54 which is centrally carried by the webs 56. The valve head 53 includes a stem 55 which is threadably mounted within the support sleeve 54. While the exhaust valve head may be otherwise constructed, the present form is preferred for the purposes of assembling the concentric valves which is most easily achieved by inserting the tubular exhaust trunk within the intake valve trunk and thereafter screwing the exhaust valve head into position in sleeve 54. When nested within the inlet valve, the exhaust valve head 53 peripherally seats upon the bottom inner edge of the inlet valve head 37.

The air holes 42, supra, are formed in the trunk 51 of the exhaust valve proximate the inlet valve air holes 41. It is to be noted that when both the inlet and exhaust valves are closed the corresponding air holes in the exhaust and inlet valves are slightly out of phase or registry. In other words, when the exhaust valve opens relative to the inlet valve the air holes move toward a more complete registry permitting a greater quantity of air to flow therethrough. Spanner wrench recesses 57 are also provided in trunk 51 for adjustment of the amount of exhaust valve opening. A split collar 58 is also threadedly mounted near the upper end of the trunk.

Collars 46 and 58 are adapted to respectively receive one end of the valve actuating rocker arms 19 and 21. It is to be noted that as rocker arm 19 opens the inlet valve 17, the coaction between the valve heads 37 and 53 will cause the exhaust valve to move with but not relative to the inlet valve. On the other hand, actuation of the exhaust valve through rocker arm 21 obviously will not cause the inlet valve to open.

The internal wall of the exhaust valve portion 52 is taper inwardly at its upper portion. Also, the upper end of support sleeve 54 is tapered externally in conformance with the taper of the aforementioned wall and coacts therewith to provide a venturi 61.

The inner edge of the inlet valve head 37 is similarly upwardly tapered to provide a venturi throat at 62 concentric with venturi 61 formed in the exhaust valve. Each of the venturis 61 and 62, by increasing exhaust gas velocity, creates a significant eductive effect on the exhaust gases thus facilitating scavenging of the combustion chamber. The further utilization of this eductive effect in conjunc with the valve cooling system will be discussed under the appropriate heading below.

In an engine employing side by side valves, it is necessary to provide two valve seats in the cylinder head which immediately limits the diametral size to something in the nature of one-half the size that may be used in the present engines which requires but a single valve opening. It is obvious that such concentric valve arrangement may therefore result in the use of an intake valve which is one hundred percent oversize. By making both the inlet and exhaust valve heads oversized there results a better time area diagram otherwise manifested as a greatly improved volumetric efficiency. In other words, the larger the valve the larger the open area through which air may flow in a given time which represents an important consideration since, as already noted, the power an engine can produce is directly related to the air that can be packed into the cylinders. The larger intake opening also provides maximum benefit from the "velocity-ram" effect at the end of the intake period.

Concentric valves also permit placing valve heads at the bottom surface of the cylinder head thus eliminating shrouding of the valve peripheries which is unavoidable with side-by-side poppet valves in the latest type of combustion chambers.

It is well known expedient to rotate a valve relative to its seat in order to equalize wear and provide long valve life. To this end it is common to incorporate a valve rotating mechanism which in addition to increasing cost and weight is subject to malfunctioning. In the present device the high velocity tangential or tornado air influx acts on the relatively large (in contrast to a conventional valve stem) tubular valve surface to rotate the inlet valve relative to its seat. In the present construction it is possible that friction between the exhaust valve trunk 51 and the cylinder head valve supporting passage at 66 would create enough circumferential drag on the valve to permit relative rotation between the exhaust valve head 53 and its seat in the inlet valve. However, to insure such relative rotation of the exhaust valve relative to its seat, the ribs or webs 56 of the exhaust valve can be shaped with a slight longitudinal helix. Such helical webs would derive a very powerful rotative reaction effort from the high velocity exhaust gases and would thus insure a rotation of the exhaust valve.

*Valve operating mechanism*

As a means for controlling valve actuation and timing, the exactness of which determines engine torque and power, the subject engine utilizes positive valve actuating mechanisms. By thus positively closing as well as opening the valve longer working and charging periods are enjoyed with a consequent increase in power output.

Figures 8, 13:
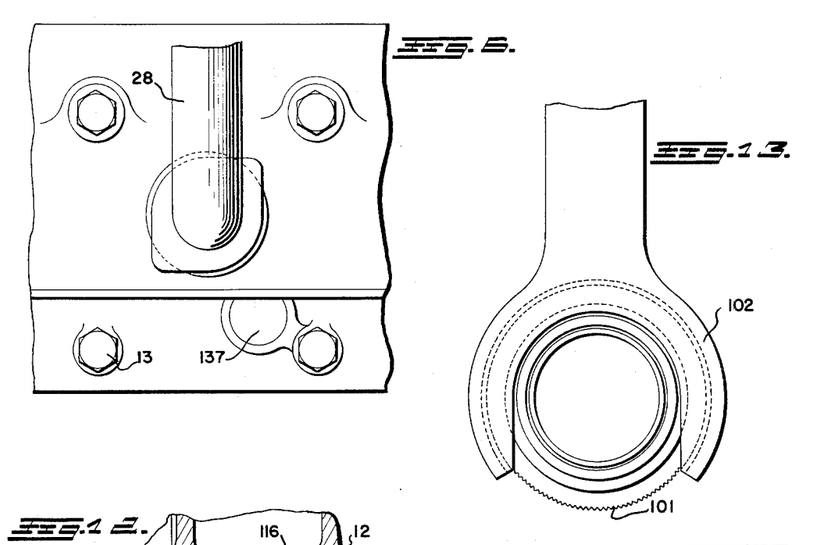
FIG. 8 is a partially sectioned plan view of the valve actuating mechanism.
FIG. 13 shows a valve adjusting tool.
Figures 8, 9:
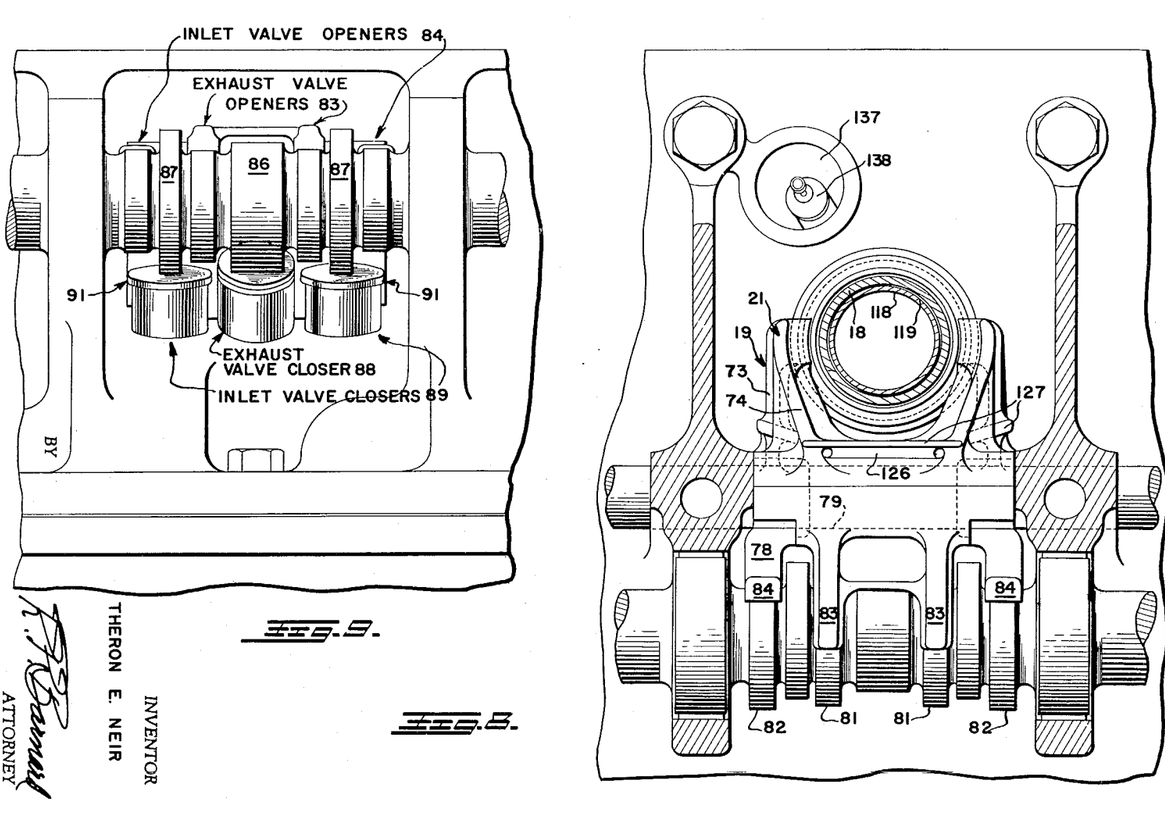
FIG. 9 is an elevational view of the valve actuating mechanism.
Figure 10:
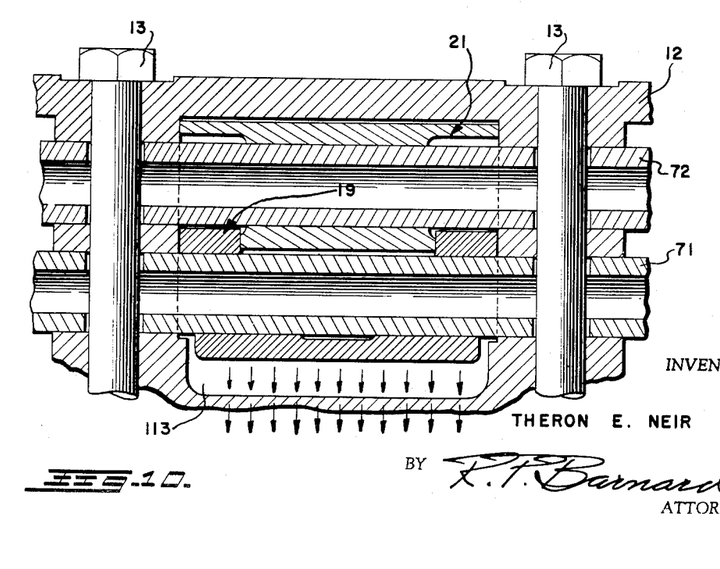
FIG. 10 is a vertical cross section through the intake and exhaust valve rocker arm shafts.

The valve actuating mechanism includes cam shaft 22, the inlet and exhaust rocker arms 19 and 21, as well as the collars 46 and 58. The rocker arms are pivotally mounted on fixed shafts 71 and 72 which are generally parallel to the cam shaft and the engine centerline.

Each rocker arm includes a bifurcated arm 73 and 74 which engages within peripheral slots 76 and 77 in the collars 46 and 58. The cam shaft end of each rocker arm also includes a furcate member 78 and 79 adapted to respectively positively engage with opener cam sets 81 and 82 through fork sets 83 and 84. Similarly closer cam sets 86 and 87 coact with the lower forks 88 and 89.

More specifically, it will be noted that there are two cams 81 and two followers 83 coacting to open the exhaust valve and a single cam 86 acting on a resilient follower 88 to close the valve. Also two cams 82 and two followers 84 are utilized to open the inlet valve while two cams 87 coact with two resilient followers 89 to close the valve.

Consideration will be given at this point to the selection of the seven cam and follower arrangements described above.

Figure 11:
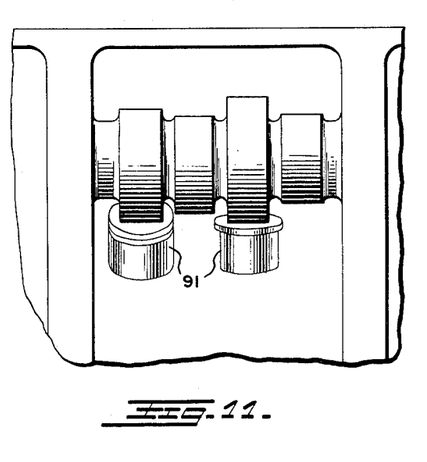
FIG. 11 shows a modified form of the valve actuating mechanism utilizing a four cam arrangement.

At first thought, it would be logical to assume that a simple single eccentric cam could be used for each valve rocker arm to both open and close the valves. It has been observed, however, that such a device will not function properly in a forked type rocker arm. This is so because the eccentric cam cannot be positioned in such a manner that the angularly disposed follower arms on the forked rocker will maintain continuous contact with the eccentric surface throughout the cycle and provide the desired periods of valve open and close time. A similar difficulty exists in trying to use a single, special contour cam in place of the true eccentric. It follows then that it is necessary to offset the two positions of the rocker arm fork and use one cam and fork half for opening the valve and a second cam and fork half for closing the valve. This results in a total of four cams and followers for the two valves, an "opener" cam and a follower, and a "closer" cam and a follower for each valve. This mechanism of four cams is apparently the simplest arrangement which will achieve the desired periods of open and close time of the valves in a four cycle engine having fully positively actuated valves. This arrangement is shown in FIG. 11.

Returning to the preferred embodiment of FIGS. 8 and 9 it will be seen that there are a total of seven rather than four cams and followers. The reason for the added number of cams and followers is as follows. It is a well known fact in piston engine design that valve operating parts are highly stressed and that deflections occur in these parts which result in faulty valve motion and misalignment of the valve in its reciprocating motion. The "four cam" mechanism previously discussed, because the valve operating loads are not symmetrically disposed or balanced with respect to the valve centerline, would probably be subject to deflections in the rocker arms which would result in harmful cocking of the valves as they return to their seats. Consequently, three additional cams, or a total of seven, are utilized to achieve perfect symmetry of the valve opening and closing loads thereby avoiding harmful twisting or "cocking" type deflections in the rocker arms. Thus, as seen in FIGS. 8 and 9, the opening and closing forks are symmetrically disposed with respect to the axis of valves.

The resilient members 91 on the valve closing rocker arm forks 88 and 89 are employed to exert the force necessary to hold the valves properly on their seats. Due to manufacturing tolerances, heat expansions, and other variables, it is impossible to rely on the closing cams to hold the valves on their seats with direct mechanical contact at the followers, hence the safety or resilient members. The small space gap 92 between the valve close or follower member and its adjustable seat and spring retainer is closed when the valve closer cam is actually operating and the mechanism then functions as a solid unit.

Each member 91 includes a support sleeve 96 formed on the outer extremity of followers or forks 88 and 89. Slidably mounted in the upper end of sleeve 96 is a cam contacting cap 97 and threadably secured in the other end of the sleeve is an adjustable plug 98 and a locknut 140. A spring 99 is seated in plug 98 and biases cap 97 upwardly into engagement with the associated cam. It is apparent that the amount of gap 92 may be adjusted by threading plug 98 inwardly or outwardly with respect to sleeve 96 and in this way manufacturing tolerances and wear of the camshaft and rocker arms may be compensated for in order to prevent excessive lash between the rocker arms and the camshaft.

*Valve adjusting mechanism*

As described, supra, there is a threaded portion on the upper end of each valve body onto which is screwed the two-piece collars 46 and 58, which as noted, have peripheral grooves 76 and 77 into which the ends of the rocker arms 73 and 74 respectively engage to translate the rotary motion of the cam members into a reciprocating motion at the valve. The adjusting devices on the intake and exhaust valves are identical, therefore, the description of one such device will suffice. Adjustment of the valve mechanism is necessary in order to compensate for manufacturing tolerances and for wear of the parts. It will be noted in the valve opening and closing mechanism that the valve opening positive acceleration loads are taken by the "opener" followers, but the valve opening negative acceleration loads are transferred to the so-called "closer" follower. The converse of this occurs in closing the valve. This transfer of loads from the "opener" followers to the "closer" followers, and vice versa, requires either a very precisely manufactured mechanism or an adjustment means whereby manufacturing tolerances and wear will not result in excessive lash and shock loads between the cams and followers when the accelerations change from positive to negative and back again in the cycle. The present adjusting mechanism has been designed in accordance with this latter alternative.

Figures 12, 13, 14:
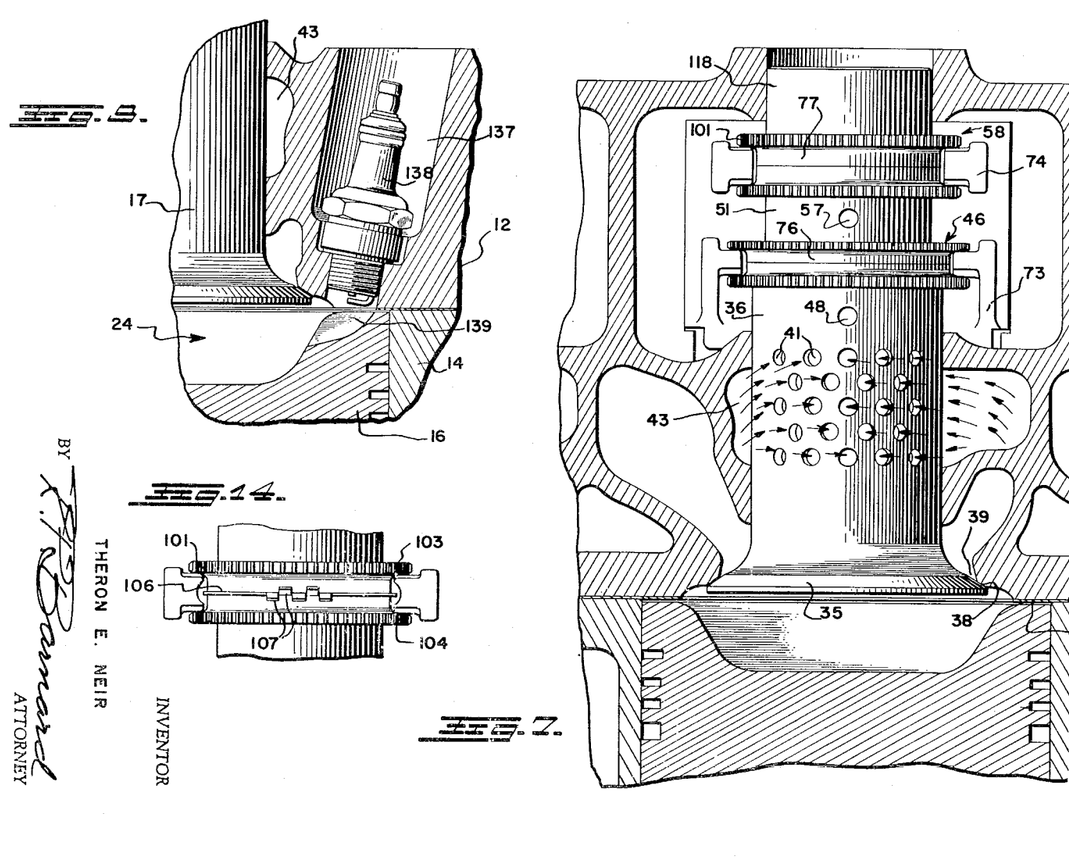
FIG. 12 represents a modification in which an oil filter is added to the air cooling system.
FIG. 14 represents a modified form of valve collar utilizing a locking device.
Figure 12:
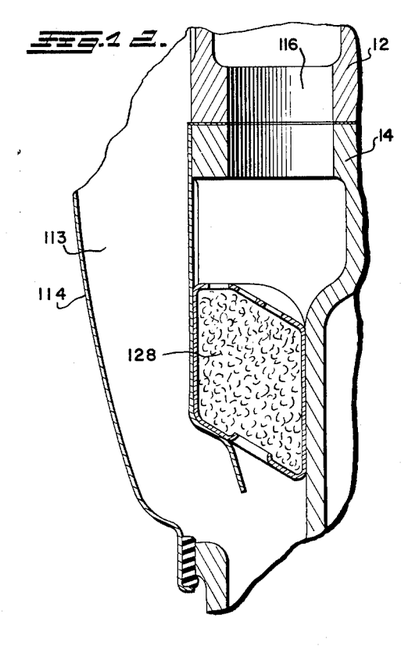

The outer edges of the shoulder or collar members 46 and 58 are serrated at 101 in such a manner as to provide a means for engagement by specially serrated wrenches 102 illustrated in FIG. 13. In adjusting the valves the two pieces 103 and 104 of a collar are separated from each other by turning them in opposite directions with the serrated wrenches. After they are loosened, the valve can be adjusted by turning the serrated members while restraining the valve body from turning by the use of a spanner wrench engaging the spanner recesses 48 or 57. To obtain the desired adjustment, a shim or gage of specific thickness would be inserted between the valve opener cams and their respective followers such as to assure that there would be a space gap between the opener followers and their cams when the valve is seated. Once the valves are properly adjusted, the two collar pieces on each valve are tightened securely to each other. As shown in FIG. 14, the present device comprehends the use of any well-known type locking device for restraining the two collar pieces against relative movement once adjusted. Such a locking device could include a thin circular piece of metal 106 having a plurality of tabs 107 on its periphery which could be bent to engage slots in the collar members.

Valve cooling system

A further reduction in the size and complication of the instant engine is realized by reducing the size and number of cored cooling pasages from that normally required in a fully water cooled engine. To this end a unique air cooling system has been developed to control the temperature of the valve bodies. In this way a considerably smaller and lighter cylinder head construction is realized. Referring to FIG. 3 the arrows indicate the path of the cooling air which enters an opening 111 in the cylinder head from a passage 112 leading from any suitable air cleaner, not shown. The force impelling or drawing air through the cylinder head is created by the eduction action which results from the expulsion of the exhaust gases from the various combustion chambers. As already described in relation to the valves per se, the exhaust valve venturis 61 and 62 greatly increase the velocity with which the exhaust gases are expelled from each combustion chamber. Thus by communicating the exhaust manifolding with the cooling air inlet, through appropriate passages, the cooling air may be drawn over the valve surfaces to be cooled.

Cooling air is generally drawn down around the exterior of the valve bodies, passing over the rocker arms, thereafter flowing out of the cylinder head through a passage 113 defined by the cylinder head 12, a cam shaft cover plate 114 and the engine block 14, and re-entering the block through passage 116 formed therein, see FIGS. 4 and 12. Passage 116 extends through the head and communicates with the air chamber 43 from whence some of the air passes directly through the registering ports 41 and 42 in the inlet and exhaust valves progressing over the inner surfaces of the inlet and exhaust valves. A portion of the air flows downwardly through the annular passage 117 to contact the valve heads 37 and 53. This valve head cooling air is thereafter drawn upwardly and also cools the inner wall of the exhaust valve before entering the exhaust manifold.

An exhaust pipe 118 projects within the exhaust valve terminating slightly above the exhaust valve head supporting member 52. Pipe 118 is radially spaced from the exhaust valve so as to define therewith an annular air cooling passage 119. A manifold retaining cap 121 and the upper end of the exhaust valve are spaced to form an annular chamber 122 connecting with annular passage 119 and a cooling air passage 123 formed in the upper wall of the cylinder head. Thus, air is drawn from passage 123 to annular chamber 122 whence it proceeds through passage 119 to cool the inner wall of the exhaust valve.

The cooling air will thus been seen to contact a substantial portion of both the inside and the outside valve surfaces by virtue of the various paths which the cooling air is made to follow and resulting in considerably reduced valve and manifold operating temperatures.

As has been noted, when the exhaust valve is closed air holes 41 and 42 are not in full registry reflecting the need for less cooling air at such time. However, with the exhaust valve open, the air holes 42 move downwardly into more complete registry with the inlet valve air holes 41 permitting the maximum amount of cooling air to be drawn through the system.

There are other reason, now to be considered, which account for what may appear at first to be the rather devious path followed by the cooling air in the instant engine. In most engines there is the problem of controlling the lubricating oil in the region of the valves to prevent leakage therethrough by way of avoiding the carbonizing of the valve. This problem is particularly acute in the instant engine because of the proximity of the cam shaft to the tubular valves. To control the oil in the instant engine, the rocker arms are closely fitted into the cylinder head at the top and ends and to each other. This close clearance will prevent any direct "splash-through" of oil from the cam shaft to the valve compartment. There will, however, be a certain amount of oil which will tend to creep along the valve end of the rocker arms. This oil would find its way to the valve bodies, run down the clearance space between them and the cylinder head, and result in overlubrication of the valves and loss of oil. To prevent this, the rocker arms, on the valve side, have been designed with catch basins 126 and protrusions 127, FIG. 8, which will restrain the oil from creeping along the arm and will cause it to be thrown off the arm before it reaches the valves. The stream of cooling air, referring again to the arrows, on its way to the exhaust valve eduction venturis will blow this oil through the passage 113 under the inlet valve rocker arm, back into the cam shaft compartment, and down along the cam shaft cover plate 114 attached to the cylinder block. Here, as the air suddenly reverses its direction, the oil, by its own inertia, will continue on downwardly into the lower region of the engine. It is intended that the system be designed to permit just enough oil to creep to the valve collar members to properly lubricate the arm and collar surfaces and the upper end of the exhaust valve, and further that just enough oil will be pulled up to the plurality of holes in the valve bodies to properly lubricate the rubbing surfaces in this region.

If it is found that an excessive amount of oil is pulled through the valve body cooling holes, a suitable filter 128 shown in FIG. 12 can be placed in the air flow path immediately before the air re-enters the cylinder head cored passage 116, so that the excessive suspended oil particles will be filtered out and drained back to the crank case.

A further object of directing the air over the collared portions of the valves is to obtain maximum cooling effect from the quantity used and to eliminate the risk of thermal shock to the hotter regions of the valve. Thus the cold entering air serves to cool the mildly hot upper and middle regions of the valve and then proceeds, by its round-about path, to the hotter lower regions where it completes the valve cooling without risk of thermal shock to the parts contacted.

The present exhaust valve manifold network, supra, as combined with the air cooling arrangement constitutes a continuously open valve cooling system. In other words a partial vacuum is maintained in the exhaust manifold at all times, thus cooling air is being continuously drawn through and over the valve stem surfaces, as described above, even though a particular exhaust valve is momentarily closed. The continuous flow of cooling air past the exhaust venturi 62 makes possible the uninterrupted inertia flow of an exhaust gas or air column through the exhaust passage 27 thus avoiding the inefficient alternate stopping and starting of the column at each opening and closing of the exhaust valve as occurs in a conventional engine. In this way, the moment the exhaust valve cracks open the air column being continuously drawn through the exhaust passage begins a powerful extraction of the exhaust gases from the combustion chamber resulting in highly efficient combustion chamber scavenging.

The instant engine also utilizes a liquid cooling system for cooling those parts of the engine not adequately cooled by the air system. Accordingly, cored liquid coolant passages such as 131 and 132 are formed in the cylinder head and are supplied with liquid to facilitate the more complete cooling of the combustion chamber area.

The jet-induced air cooling of valves and "air shielding" of the new and original passage for exhaust gas greatly reduces requirements for standard cooling equipment on the engine, i.e., smaller cooling fan, smaller quantity of coolant on liquid cooled engines, as well as simpler finning and less air circulation on air cooled engines. Further, the high velocity exhaust gas and jet-induction of cooling air permits the use of a cheap, thin-walled, fabricated exhaust manifolding in contrast to the expensive, heavy and bulky cast manifolds used on most engines. This cheap, thin-walled exhaust manifolding incorporates individual, highly efficient, smooth turn branches from each cylinder of multi-cylinder engines to common union with a large main exhaust manifold 129 to provide continuous jet-induction of fresh air to the valve cooling passage of each cylinder at all times.

*Exhaust manifold*

An important reason for the high efficiency of the present engine resides in the ability to utilize an exhaust manifold having a high flow efficiency. As particularly seen in FIG. 3 the straight-up exhaust passage 27 combined with a smoothly curving exhaust manifold 28 appreciably reduces the frictional flow losses encountered in the conventional tightly curved exhaust passage. The manifolding as described makes possible the use of more efficient and cheaper devices for the conversion of exhaust gas velocity energy into useful work—more efficient because of higher gas velocity and cheaper because of lower operating temperatures.

The new type exhaust manifold also permits the design, for heavy duty operation, of a simple and cheap turbo-evacuator device for supplementing the jet-induction of air through the valve cooling system, or the design of turbo-driven superchargers for supercharging the engine or for cooling engine components, or the design of turbo-driven devices for compounding the power of the engine.

*Combustion chamber*

The cylinder head 12 overlies the cylinder periphery sufficiently to enable the former to coact with the piston 16 to define a full circumference squish area 136. The tornado swirl of the incoming charge, as already noted, provides a completely homogeneous mixture of fuel and air which with the large squish area combine to yield better detonation control at high compression ratios.

The concentric valves centrally located within the surrounding squish area provide maximum benefit from valve timing overlap in clearing the chamber of burned gas resulting in less dilution of the charge and a lower mixture temperature.

A recess 137 is provided in the cylinder head which is bored at the inner end to receive a spark plug 138. The squish area around the spark plug is specially shaped at 139 to fire a flame trigger into the turbulent charge. Particularly in the present compact combustion chamber, the extremely turbulent charge coupled with the "squished trigger" flame propagation provides a very fast and yet smooth burning of the charge at extra high compression ratios.

The compact combustion chamber with the concomitantly smaller heat loss resulting from the diminution in size promotes greater work recovery per explosion, higher thermal efficiency and accordingly greater fuel economy.

The tangential port and concentric valve arrangement provides maximum benefit from the blast cleaning of the combustion chamber and valves of carbon deposits without removing the cylinder head from the engine. Also, the concentric valve arrangement placing the valve heads at the bottom of the cylinder head makes possible the grinding of the valves without removing the valves from the cylinder head.

While the present invention has been disclosed as including specific types of components and arrangements of components it is apparent that many structural and orientation modifications with respect to the components are comprehended within the scope of the invention.

I claim:

1. A valve actuating mechanism for an internal combustion engine which comprises a rocker arm mounted proximate said valve and operatively connected directly thereto, a rotary cam shaft operatively connected to said rocker arm, said rocker arm being pivotally mounted on a shaft generally parallel to the cam shaft and including a first bifurcated portion adapted to operatively engage said valve, valve opening and closing cams on said cam shaft, said rocker arm including a second furcated portion having at least one fork engaging an opening cam and at least another fork engaging a closing cam whereby said valve is positively opened and closed, and resilient means intermediate the closing cam and said another fork to insure closing of said valve.

2. An internal combustion engine including in combination a cylinder head, a pair of concentric air valves reciprocally supported in said head, and an actuating mechanism for said valves, said mechanism comprising a cam shaft having a plurality of axially spaced valve opening and closing cams, a rocker arm for each valve pivotally mounted on a shaft generally parallel to the cam shaft intermediate the latter and the valves, each rocker arm including a first bifurcated portion adapted to circumferentially engage one of said valves, a second furcated portion having a set of forks respectively engaging said opening cams and at least one fork engaging a closing cam, and means mounted on each of said valves for adjusting the stroke of said valves within said cylinder head.

3. An internal combustion engine including in combination a cylinder head, a pair of concentric air valves reciprocally supported in said head, and an actuating mechanism for said valve, said mechanism comprising a cam shaft having a plurality of axially spaced valve opening and closing cams, a rocker arm for each valve pivotally mounted on a shaft generally parallel to the cam shaft intermediate the latter and the valves, each rocker arm including a first bifurcated portion adapted to circumferentially engage one of said valves, a second furcated portion having a set of forks respectively engaging said opening cams and at least one fork engaging a closing cam, means mounted on each of said valves for adjusting the stroke of said valves within said cylinder head and means associated with each rocker arm for maintaining said forks in engagement with said cams.

4. An internal combustion engine including in combination a cylinder head, a stemmed air valve supported within said head, a split collar mounted on the stem of said valve, a pivoted rocker arm having one arm in operative engagement with said collar and means for causing a rocking movement to be imparted to said rocker arm, said collar comprising a pair of elements severally movable relative to the valve stem, said members being normally in abutting relation, means for axially moving each of said collar members relative to each other in order to adjust the length of stroke of said valve and means for restraining said valve against rotation when changing the axial positions of said collar elements relative to said valve.

5. A valve actuating mechanism for an internal combustion engine which includes a pair of concentric intake and exhaust valves, said mechanism comprising a rocker arm operatively connected to each of said valves, each rocker arm being pivotally mounted intermediate its ends on a shaft, said shafts being disposed one above the other in parallel relation, and a camshaft drivingly connected to said rocker arms, each rocker arm including a first bifurcated portion circumferentially engaging the associated valve, said arms including second bifurcated portions operatively engaging said camshaft to positively open and close said valves, said second bifurcated portions of the rocker arms being symmetrically disposed with respect to the axis of said valves to prevent cocking of the valves during actuation thereof.

6. A valve actuating mechanism as described in claim 5 in which each of said second bifurcated arm portions includes a plurality of forks which coact with valve opening and closing cams on said camshaft, and at least one of said forks on each arm including resilient means for automatically maintaining said forks in contact with the related cams.

7. A valve actuating mechanism as defined in claim 6 in which said resilient means comprises a cylinder formed on said fork, a piston reciprocally disposed in said cylinder and resilient member intermediate said cylinder and piston tending to bias said piston into engagement with the related cam.

References Cited in the file of this patent

UNITED STATES PATENTS

| | | |
|---|---|---|
| 1,157,379 | Gibbs | Oct. 19, 1915 |
| 1,232,108 | Sims | July 3, 1917 |
| 1,311,200 | Abell | July 29, 1919 |
| 1,399,283 | Zucker | Dec. 6, 1921 |
| 1,408,781 | Sewell | Mar. 7, 1922 |
| 1,671,973 | Anderson | June 5, 1928 |
| 1,754,888 | Gerard | Apr. 15, 1930 |
| 2,049,186 | Zahodiakin | July 28, 1936 |
| 2,122,806 | Abell | July 5, 1938 |
| 2,213,202 | Buchi | Sept. 3, 1940 |
| 2,252,171 | Doman | Aug. 12, 1941 |
| 2,277,822 | Essl | Mar. 31, 1942 |
| 2,428,886 | MacPherson | Oct. 14, 1947 |
| 2,457,652 | Fisher | Dec. 28, 1948 |
| 2,840,059 | Buchi | June 24, 1958 |

FOREIGN PATENTS

| | | |
|---|---|---|
| 268,602 | Great Britain | Apr. 7, 1927 |
| 1,029,745 | France | Mar. 11, 1953 |